United States Patent
Wengrovitz et al.

(10) Patent No.: US 8,867,996 B2
(45) Date of Patent: Oct. 21, 2014

(54) AREA TRACKING SYSTEMS AND METHODS OF TRACKING ELECTRONIC DEVICES

(75) Inventors: Michael Wengrovitz, Concord, MA (US); Tom Janiszewski, Andover, NJ (US); Qiru Zhou, Scotch Plains, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 952 days.

(21) Appl. No.: 13/006,840

(22) Filed: Jan. 14, 2011

(65) Prior Publication Data

US 2012/0184209 A1    Jul. 19, 2012

(51) Int. Cl.
| | |
|---|---|
| H04B 7/00 | (2006.01) |
| H04L 29/08 | (2006.01) |
| H04W 4/02 | (2009.01) |
| H04W 4/20 | (2009.01) |
| H04W 4/04 | (2009.01) |
| H04L 29/06 | (2006.01) |

(52) U.S. Cl.
CPC .............. *H04L 67/125* (2013.01); *H04L 67/12* (2013.01); *H04W 4/02* (2013.01); *H04W 4/20* (2013.01); *H04W 4/028* (2013.01); *H04W 4/04* (2013.01); *H04L 69/28* (2013.01)
USPC ........... 455/41.2; 455/518; 455/519; 709/227

(58) Field of Classification Search
USPC ................. 455/41.1, 41.2, 518, 519; 709/227
See application file for complete search history.

(56) References Cited

U.S. PATENT DOCUMENTS

| | | | |
|---|---|---|---|
| 7,509,417 B1 | 3/2009 | Kammer et al. | |
| 7,792,490 B2 * | 9/2010 | Annola et al. | 455/41.2 |
| 8,149,090 B2 * | 4/2012 | Hall et al. | 340/5.92 |
| 2003/0081588 A1 | 5/2003 | Simbirski et al. | |
| 2007/0143499 A1 | 6/2007 | Chang | |
| 2010/0153983 A1 | 6/2010 | Philmon et al. | |

FOREIGN PATENT DOCUMENTS

| | | |
|---|---|---|
| EP | 1513290 | 3/2005 |
| WO | WO 2005/096568 | 10/2005 |

OTHER PUBLICATIONS

International Search Report/Written Opinion dated Jul. 5, 2012, issued in Application No. PCT/US2012/020655.

* cited by examiner

*Primary Examiner* — Raymond Dean
(74) *Attorney, Agent, or Firm* — Harness, Dickey & Pierce (57) ABSTRACT

Area tracking systems including a plurality of short range sensors that are communicatively connected to a server and methods of tracking electronic devices. The electronic devices are tracked by polling for the electronic devices, the polling including transmission of electronic addresses corresponding to the electronic devices and determining whether a reply to the poling is received. The electronic addresses are each stored on one of a plurality of lists. Each of the lists may be polled at a different frequency and may include a different number of electronic device addresses.

25 Claims, 6 Drawing Sheets

AREA TRACKING SYSTEMS AND METHODS OF TRACKING ELECTRONIC DEVICES

BACKGROUND OF THE INVENTION

1. Field

Example embodiments relate to area tracking systems and methods of tracking electronic devices, and more particularly to an area tracking system including a distributed network of short range sensors and methods of detecting the location of electronic devices using the short range sensors.

2. Description of the Related Art

Short range wireless connectivity for exchanging data between electronic devices is widely used. For example, Bluetooth radios are resident in a wide range of electronic devices and in almost all mobile phones and smart phones. Bluetooth is an open wireless technology standard for exchanging data over a range from about 1 m to about 100 m using frequency-hopping spread spectrum which divides data over as many as 79 bands (1 MHz each) in the range 2402-2480 MHz.

A multitude of services may be offered to a user using a Bluetooth radio to connect a foreign electronic device to a user's device. Many of the services can expose private data or allow the foreign party to control the user's device. Accordingly, it is in the interest of the user to be able to screen which devices are allowed to connect to their device. However, for convenience, it is also in the interest of the user to allow foreign Bluetooth devices to automatically establish a connection without user intervention when they come into range.

To accommodate both interests, Bluetooth uses a process called pairing to establish a connection between electronic devices. A user generally initiates pairing manually by exposing their device's Bluetooth link to other devices. The pairing process is typically triggered automatically the first time a device receives a connection request from a device with which it is not yet paired. Once a pairing has been established each device retains a record of the pairing and the devices may subsequently reconnect to each other without user intervention.

Bluetooth is a packet-based protocol with a master-slave relationship. The master device is responsible for timing and access control in a Bluetooth network (e.g., a "piconet") and may be connected to as many as 7 slave devices.

Each Bluetooth enabled device includes a Bluetooth radio that is identified by a unique permanent 48-bit Bluetooth Device Address (BD_ADDR). In general, electronic devices including Bluetooth radios are personal to a specific user and the detection of a specific BD_ADDR in most cases is the same as detection of the specific user. In certain cases, for example as with a security supervisor in an airport, the user carries multiple Bluetooth enabled devices and the detection of more the one of the devices increases the probability that the user is present.

The detectability of a Bluetooth device is dependent on a mode setting of the device. In a discovery/inquiry mode, a discovering device sends identification (ID) packets including an access code such as a General Inquiry Access code (GIAC), a Dedicated Inquiry Access Code (DIAC) or a Limited Inquiry Access Code to every device in proximity of the discovering device. Any device in the discoverable mode that is within range responds to the ID packets by sending a Frequency Hop Synchronization (FHS) packet that discloses the BD_ADDR and native clock (CLKN) of the discovered device.

However, many electronic devices in widespread usage are configured to be in a non-discoverable mode. For example, certain phones do not promiscuously respond to a general discovery inquiry due to security and privacy concerns. Allowing promiscuous discovery may result in the user being sent messages they are not intended to receive, thereby allowing phone spamming. The setting for discoverability is typically not exposed to a user and is often fixed by the manufacturer of the electronic device.

Electronic devices that are not in the discoverable mode but are set to be connectable can still be detected in the page and page scan states. In paging, the master device will transmit an ID packet including a Device Access Code (DAC) that is based on the Lower Address part (LAP) of the user's BD_ADDR. When the electronic device of the user detects the ID packet including the user device's DAC, it will reply by transmitting the user device's DAC back to the discovering device. A typical response time to paging is 1 sec or less. In complex and/or cluttered radio environments, a response time may be 2-3 seconds.

Although a user device is discoverable in the page and page scan states, the detecting device must have possession of, for example, the user's DAC.

SUMMARY OF THE INVENTION

Example embodiments include an area tracking system having a server connected to a network and a plurality of sensors connected to the server. The sensors are configured to poll for at least one electronic device using an identification packet including an address of the electronic device.

Other example embodiments include methods of tracking a plurality of electronic devices using a plurality of sensors connected to a server. The methods include polling, by a sensor, for a first electronic device using an identification packet that includes an address of the first electronic device, and determining whether the first electronic device is within range of the sensor based on whether or not the first electronic device replies to the polling within a period of time. A server transmits data relating to a position of the first electronic device.

Still other example embodiments include methods of tracking a plurality of electronic devices using a plurality of sensors connected to a server. The methods include maintaining, by a first sensor, first and second lists including a plurality of electronic device addresses corresponding to a plurality of electronic devices and sequentially polling, by the first sensor, for the plurality of electronic devices. The sequential polling is performed by sequentially transmitting identification packets including the electronic device addresses of the first and second lists and determining, by the first sensor, whether one of the plurality of electronic devices is in range of the first sensor. The first sensor determines if one of the plurality of electronic devices is in range of the first sensor based on whether or not a reply to the sequential poll corresponding to the one of the plurality of electronic devices is received by the first sensor within a first period of time. A server transmits data relating to a position of the one of the electronic devices.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Figure 1:
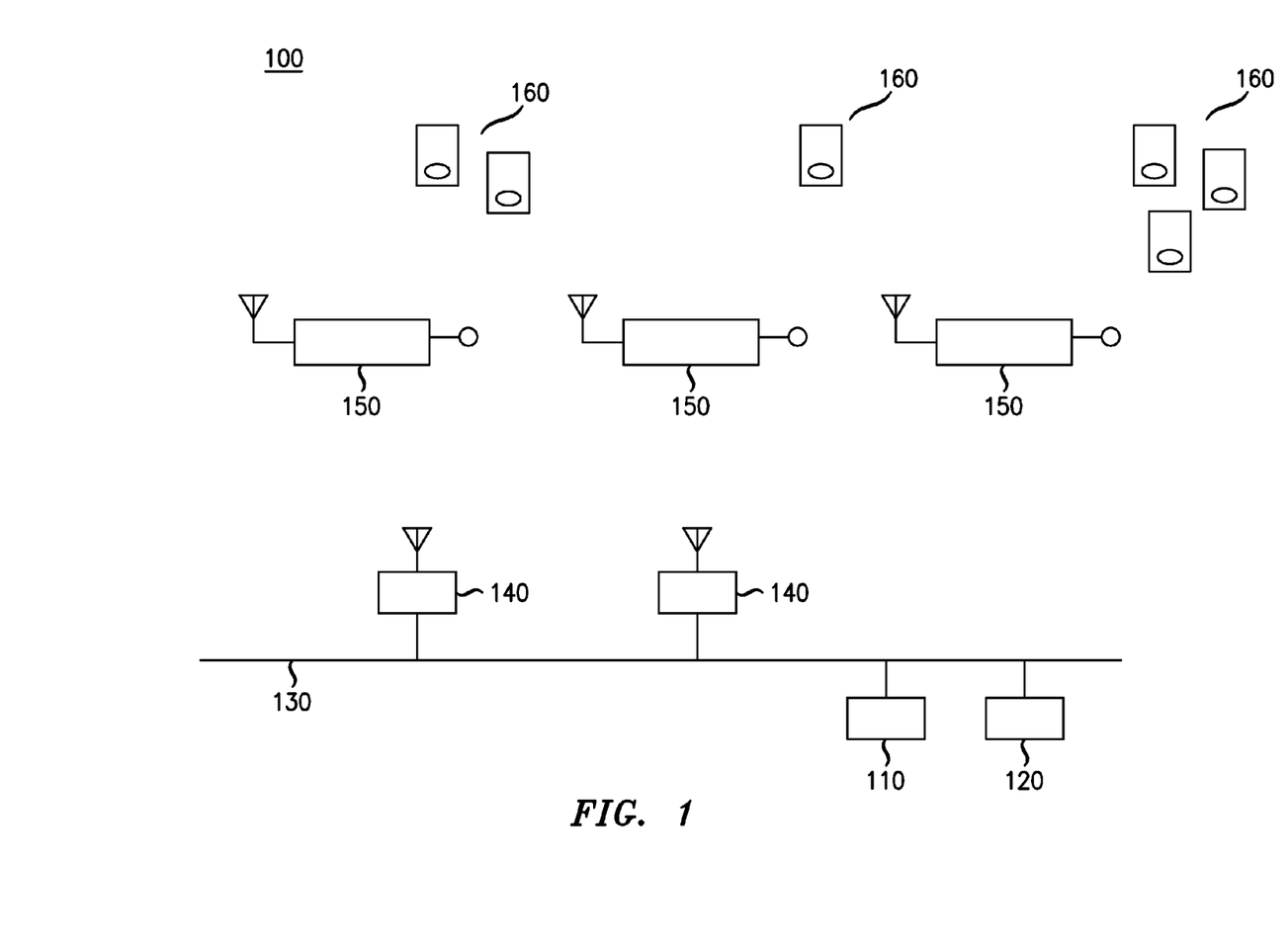
FIG. 1 is a diagram illustrating area tracking systems according to an example embodiment.

FIG. 1 is a diagram illustrating an area tracking system 100 according to an example embodiment. Referring to FIG. 1, an area tracking system 100 may include an area tracking server (ATS) 110, a location-based services (LBS) server 120, a network 130, access points 140 and sensors 150.

The ATS 110 may track electronic devices 160, such as laptops, netbooks and/or mobile phones, using the sensors 150. The sensors 150 may be distributed across a defined area in order for the ATS 110 to track the electronic devices 160. According to an example embodiment, the sensors 150 may be distributed across a large indoor and/or outdoor facility (not shown) such as an airport, a shopping mall and/or a college campus. For example, the sensors may be distributed across an airport to track electronic devices at each airline gate, retail store, café, restaurant, parking lot and hallway.

According to an example embodiment, the sensors 150 are configured to poll for at least one electronic device using an identification packet including an address of the electronic device. For example, the address of the electronic device may be a BT-MAC-ID and/or other address that, when broadcast, causes the electronic device to reply.

Addresses of electronic devices may be included in one or more lists that may be used by at least one of the sensors 150 and/or the ATS 110. The lists may be compiled at the ATS 110 and/or sent to the ATS 110. The lists may be maintained by the sensors 150, the ATS 110, or both of the sensors 150 and the ATS 110.

According to an example embodiment in which each sensor 150 maintains one or more lists of electronic device addresses, a sensor 150 may poll for electronic devices within range of the sensor 150. For example, the sensor 150 may be configured to sequentially broadcast the addresses of the one or more lists. An electronic device 160 in range of the sensor 150 will reply when receiving a packet including the address of the electronic device 160. A sensor 150 receiving a reply may notify the ATS 110 that an electronic device 160 has been detected.

Coverage of the sensors 150 may be overlapping or non-overlapping. According to an example embodiment in which 2 or more sensors 150 overlap in coverage, a location of an electronic device may be determined with greater accuracy. For example, by using received signal strength indications (RSSIs) it may be determined if the electronic device 160 is closer to one or the other of the sensors 150. Tracking, averaging and other methods may also be used.

The sensors 150 may be connected to the ATS 110 through the access points 140 and the network 130. The access points 140 may be WiFi access points and the sensors 150 may be Bluetooth measurement sensors/scanners wirelessly connected to the access points 140. The network 130 may be, for example, an internet protocol (IP) local-are-network (LAN). The sensors 150 may be configured in an access-point-client mode so that each sensor 150 establishes a client into an existing WiFi/LAN infrastructure. Measurement results collected by the sensors 150 may be backhauled to the network 130 across a WiFi radio link to the access points 140. Accordingly, the sensors 150 may only require connection to a power source (not shown). The ATS 110 may be connected to and receive the measurement results from the network 130.

The sensors 150 may be connected to the ATS 110 through the network 130 in a wired configuration not including the access points 140. The sensors 150 may include, for example, WiFi subsystems configured to act as a WiFi access points and provide WiFi-based network connectivity between electronic devices 160 and the network 130. Although Bluetooth and WiFi occupy the same unlicensed frequency band at 2.4 GHz, both types of systems may co-exist, operate simultaneously and co-reside within the same appliance without interference due to adaptive frequency-hopping RF capabilities resident in all Bluetooth radios. According to an example embodiment not including access points 140, the sensors 150 may require both a power connection and a wired network connection (not shown).

The sensors 150 may be configured to operate in mesh network configurations, and/or in various combinations where at least one sensor 150 is a WiFi access point and at least one sensor 150 is an access point client. There are many such examples, combinations and possibilities known to those skilled in the art of WiFi network design and deployment.

A sensor 150 may be a short range scanner/sensor transmitting and receiving data in a range that is less than a range of a base station connected to mobile terminals. For example, a range of the scanner/sensor may be from about 1 m to about 100 m. A sensor 150 may include a universal serial bus (USB) Bluetooth dongle attached to a WiFi router with suitably modified internal firmware.

According to other example embodiments, a sensor 150 may be a scanner/sensor with built-in short range transmission capability. For example, a sensor 150 may be a scanner/sensor with built-in Bluetooth capability and/or may have one or more wired ports. It is noted that although example embodiments are described herein with reference to Bluetooth and WiFi connectivity technologies, example embodiments are not so limited and other communication technologies are contemplated. For example, the sensor 150 may comply with WiFi/3G/4G and/or other types of network connectivity standards.

Figure 2:
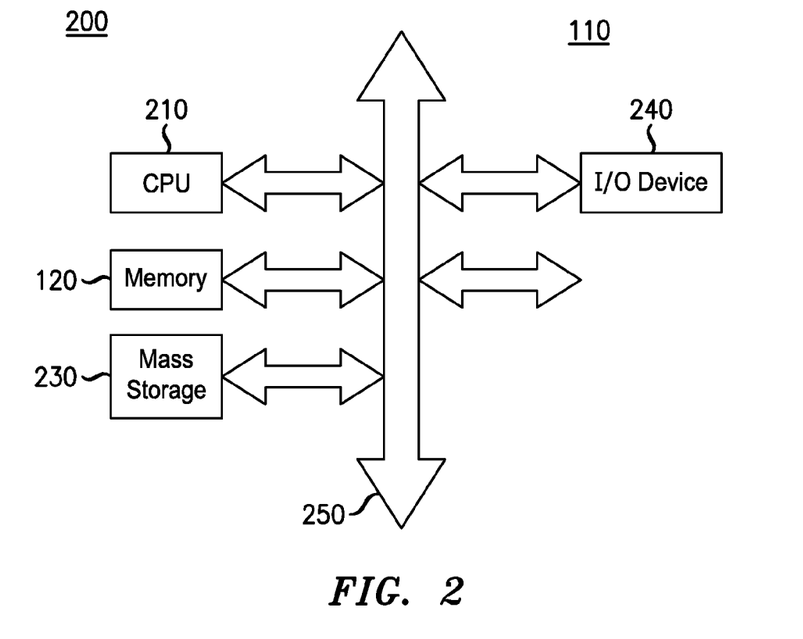
FIG. 2 is a schematic diagram illustrating area tracking servers according to an example embodiment.

FIG. 2 is a schematic diagram illustrating an area tracking server (ATS) 110 according to an example embodiment. Referring to FIG. 2, an ATS 110 may include a bus 250 connecting a processor 210, a memory 220, mass storage 230 and input/output device 240. The processor 210, the input/output device 240, the mass storage 230 and the memory 220 may perform data communication with each other by using the bus 250. For example, according to commands of the processor 210, the memory 220 and the processor 210 may exchange data. Accordingly, the memory 220 may store data in the memory 220 and/or output data from the memory 220. Similarly, the mass storage 230 may exchange data with the processor 210 and/or a memory controller of the memory 220. The mass storage 230 may store data in the mass storage 230 and/or output data from the mass storage 230. The memory 220 and/or the mass storage 230 may store codes and/or programs for operations of the processor 210.

The processor 210 may execute a program and control the ATS 110. The input/output device 240 may be used to input/output data to/from the ATS 110. The ATS 110 may be connected to an external device. For example, the ATS 110 may be connected to the access points 140, the sensors 150 and/or the LBS 120 by using the input/output device 240, and may exchange command and control information with the sensors 150.

The ATS 110 may be a single controlling server that controls the sensors 150. The ATS 110 may be resident in an area including a distributed network of sensors 150 and/or may be located remotely from the sensors 150 across the network 130. For example, the ATS 110 may be in a hosted services deployment. The ATS 110 may operate in a high-availability and redundant mode for reliability purposes, so as to eliminate a single point of failure.

Electronic device addresses may be provided to the ATS 110 and/or the sensors 150 through, for example, enrollment or registration by end users of the electronic devices. For example, each end-user might be required to provide the BT-MAC-ID, typically viewable within the About-Menu of his/her mobile phone, as part of an enrollment process. A person might visibly see the BT-MAC-ID in his/her mobile phone and then, for example, manually enter and submit this ID to an area tracking system 100 by filling out a form, sending an email, and/or using a Web or other computer-based interface.

Figure 3:
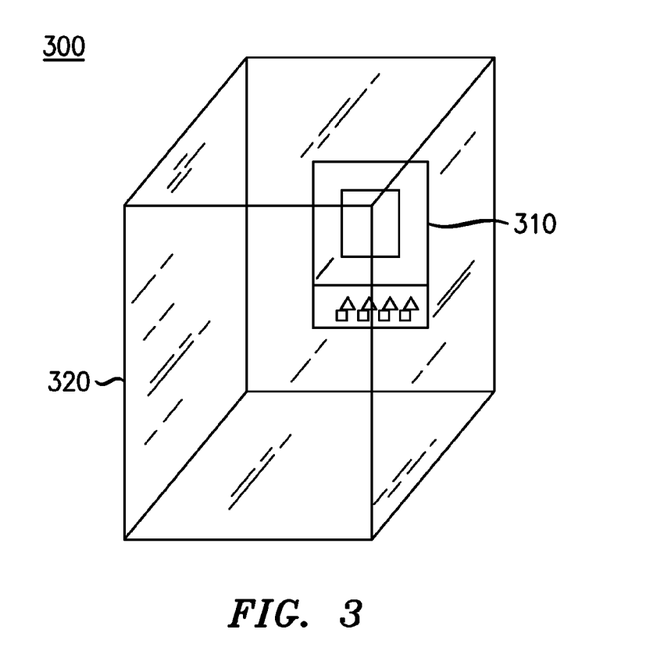
FIG. 3 is a perspective diagram illustrating kiosks according to an example embodiment.

FIG. 3 is a perspective diagram illustrating a registration kiosk 300 according to an example embodiment. Referring to FIG. 3, a registration kiosk 300 may be, for example, a free-standing, self-service device used to provide a service and/or sell merchandise to a user. A registration kiosk 300 may include a terminal 310 mounted on an enclosure 320. A user may access services, purchase merchandise and/or register electronic device addresses using the terminal 310. The kiosk 300 may send registered electronic device addresses to an ATS 110 for distribution to sensors 150, compile electronic device address lists for subsequent distribution to the sensors 150 and/or send electronic device addresses directly to the sensors 150.

According to an example embodiment, a registration kiosk 300 may be used to automatically measure an electronic device address. For example, a registration kiosk 300 may emulate the operation of a Bluetooth headset. A registrant seeking to register an electronic device 160 may enter personal information such as the registrant's name and a mobile phone telephone number using the terminal 310. The registrant may be provided with instructions on how to pair an electronic device 160 to the terminal 310 of the registration kiosk 300.

During a pairing process with the registration kiosk 300, a radio (e.g., a Bluetooth radio) in the terminal 310 may determine an electronic address of the electronic device 160 which is fully exposed over-the-air during the pairing process. The address measured by the terminal during the pairing process may be sent to the ATS 110. The ATS 110 may associate the electronic device address with the personal information entered during the registration process. The electronic device address may be obtained regardless of whether the electronic device 160 completes pairing to the terminal 300 and/or whether the electronic device 160 is subsequently paired to a different device than the terminal 310. The ATS 110 may retain the electronic device address along with an association to the registrant's personal information.

According to other example embodiments, the kiosk 300 may automatically sniff an electronic device address of an electronic device 160 from an existing connection. For example, a registrant with an electronic device 160 paired to another electronic device (e.g., a Bluetooth headset) may enter personal information as described above, and the existing communication link between the paired devices may be automatically sniffed.

As one example, the electronic device 160 may be a mobile phone connected to a headset. The terminal 310, upon entry of the personal information, may sniff an existing connection and/or place a telephone call to the mobile phone in order for communication to occur between the phone and headset. Once communication is established, an associated electronic device address may be sniffed. Signal level and received signal strength indication (RSSI) of the connection may be measured by the terminal 310 to establish that the sniffed electronic device address corresponds to a particular registrant and not to a nearby user of a different electronic device.

A registration kiosk 300 may provide services and/or sell merchandise to a user. For example, a registration kiosk 300 may provide check-in services at an airport, provide general information, and/or provide banking services. A registration kiosk 300 may be a dedicated registration kiosk 300 that does not provide a service and/or sell merchandise to a user. For example, incentives (e.g., coupons, rebates, and/or discounts) may be provided to a user volunteering to register an electronic device 160 at a terminal 310.

Although generation of electronic device address lists are described with respect to registration and enrollment using a kiosk, example embodiments are not so limited. Lists may be generated using a variety of sources and may include a priori information. For example, area tracking may be used by employers to track electronic devices associated with employees. Lists of electronic addresses may be compiled based on employee work schedules. Other examples may include tracking cargo and/or electronic devices of customers. Lists of electronic addresses may be compiled from a priori sources such as cargo manifests where cargo includes one or more electronic devices and/or passenger lists maintained by common carriers (e.g., airlines).

Figure 4:
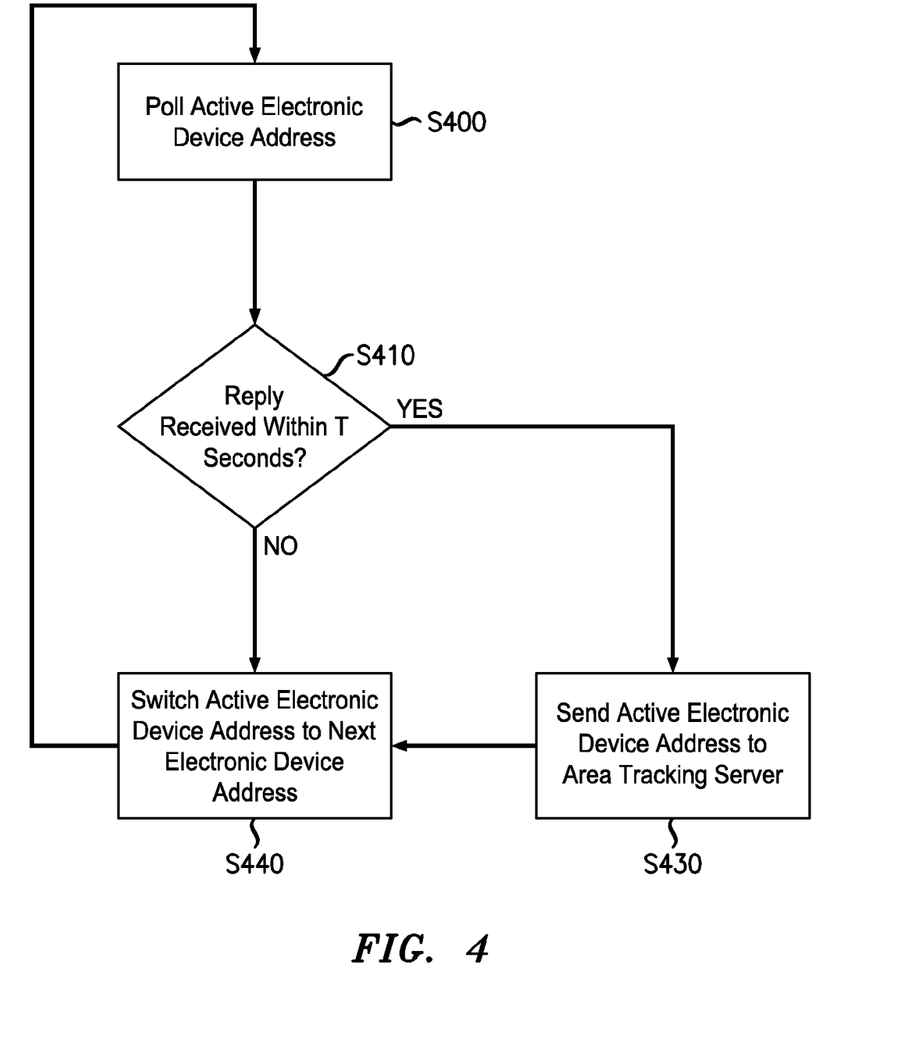
FIG. 4 is a flow diagram illustrating methods of tracking electronic devices using short range scanners/sensors according to a single list example embodiment.

FIG. 4 is a flow diagram illustrating methods of tracking electronic devices using a sensor 150 of FIG. 1 according to a single list example embodiment. Referring to FIG. 4, a sensor 150 may sequentially poll for a plurality of electronic devices corresponding to electronic device addresses in order to determine if any of the electronic devices are within range of the sensor 150. Hereinafter, the electronic device address of the electronic device currently being polled for is termed the 'active' electronic device address.

In step S400, a sensor 150 may poll for an electronic device by broadcasting the active electronic device address (e.g., a BT-MAC-ID). At step S410, the sensor 150 may wait for a reply for up to a time period T (e.g., 5 seconds) or until a reply is received from the corresponding electronic device. If a reply is received at step S410, the sensor 150 may send the active electronic device address to an ATS 110 at step S430 and, at step S440, the sensor 150 may select a different electronic device address as the active electronic device address. At step S400, the sensor 150 may poll for the active electronic device address. If no reply is received within T seconds at step S410, the sensor 150 may select a different electronic device address as the active electronic device address at step S440. At step S400, the sensor 150 may poll for the new active electronic device address.

Figure 5:
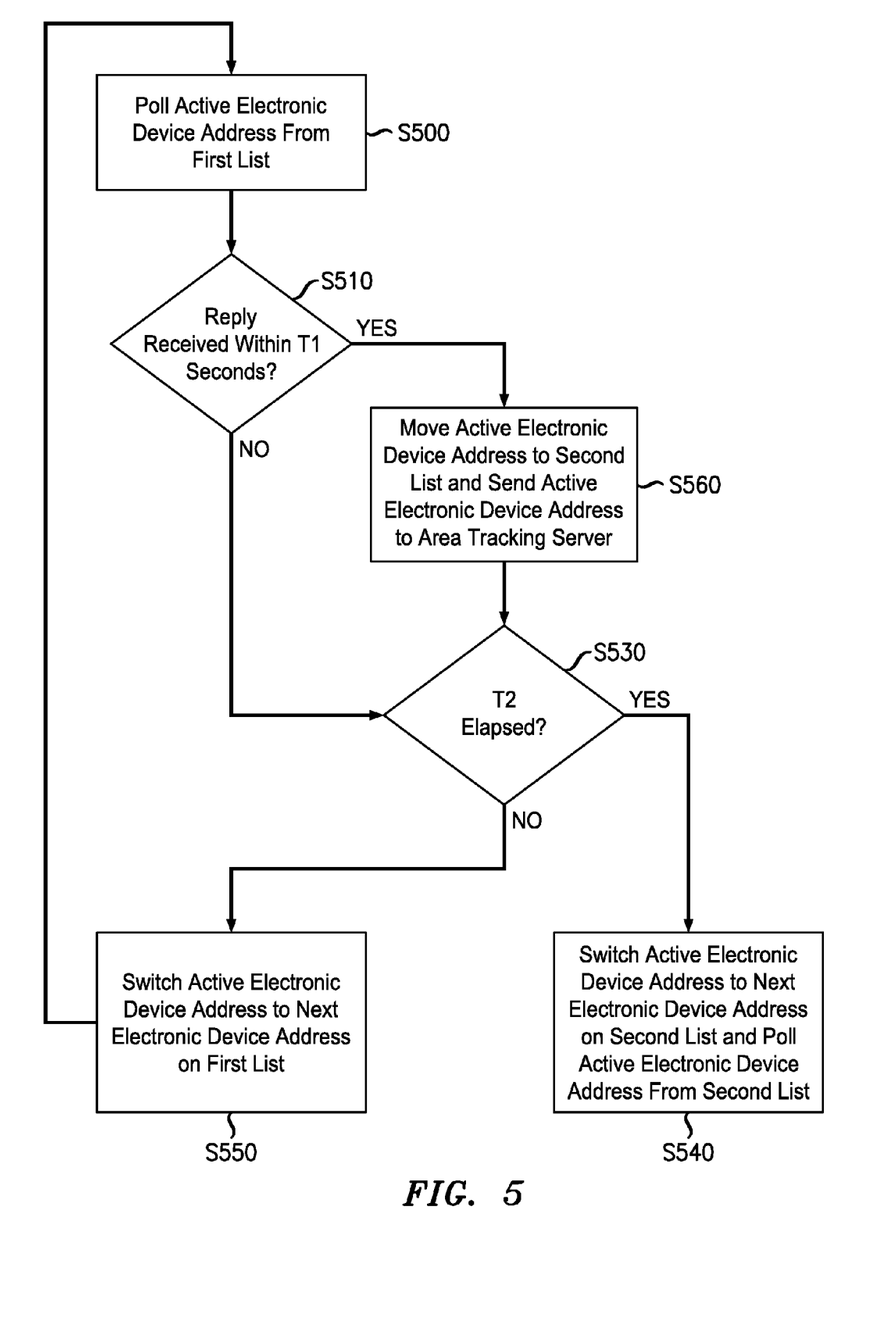
FIG. 5 is a flow diagram illustrating methods of tracking electronic devices using short range scanners/sensors according to a first list of a dual list example embodiment.
Figure 6:
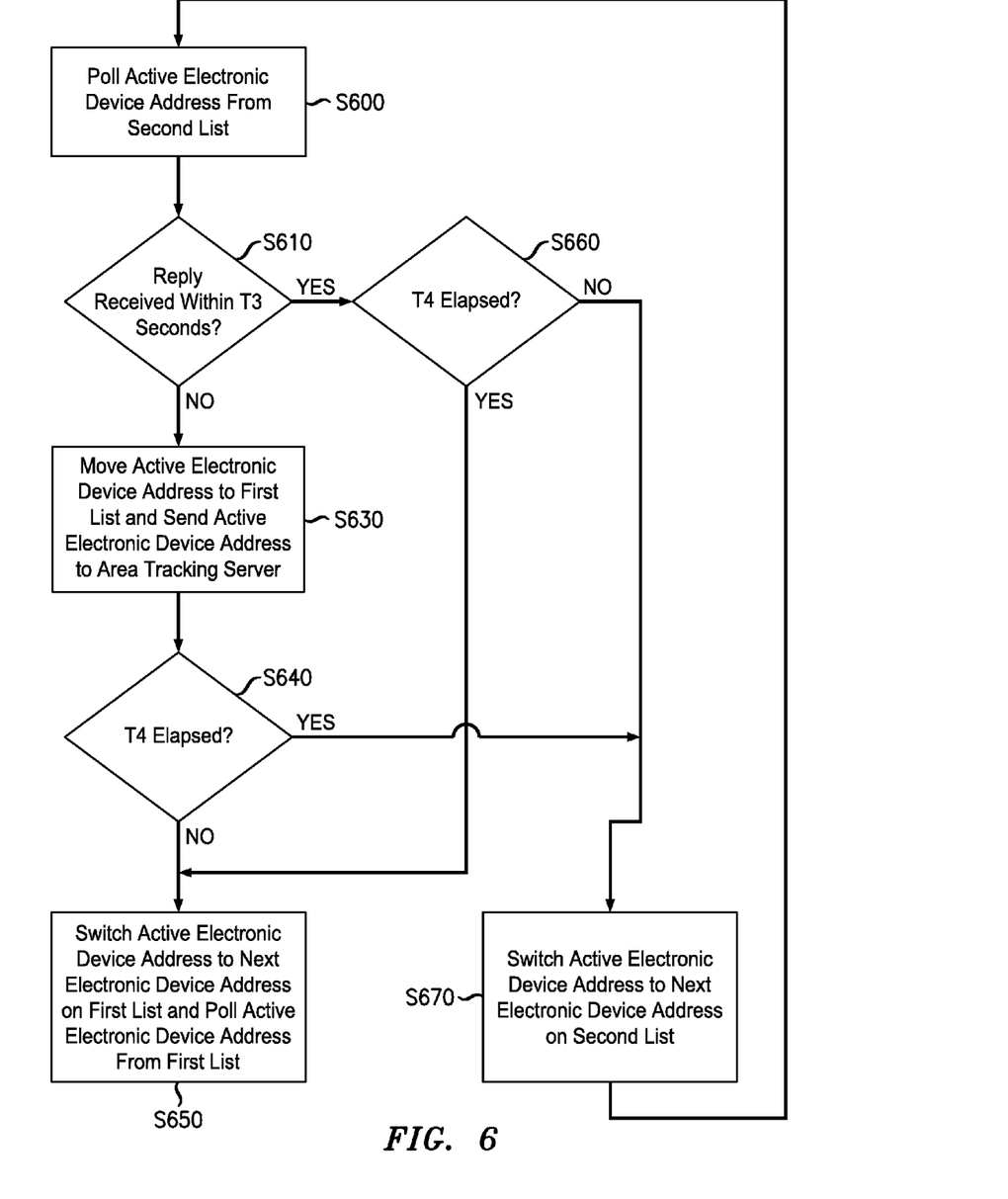
FIG. 6 is a flow diagram illustrating methods of tracking electronic devices using short range scanners/sensors according to a second list of a dual list example embodiment.

FIGS. 5 and 6 are flow diagrams illustrating methods of tracking electronic devices using a sensor 150 of FIG. 1 according to a dual list example embodiment.

According to a dual list example embodiment, each sensor 150 may store two lists of electronic device addresses. A sensor 150 may poll for the electronic devices corresponding to each list at different frequencies. For example, a first list may be a 'slow-list' and a second list may be a 'fast-list.' Electronic devices corresponding to a slow list may be polled for at a lower frequency than and electronic device corresponding to the fast-list.

Electronic device addresses of electronic devices may be assigned to a slow list or a fast list (or both) based on one or more factors. For example, if an electronic device is known to be within range of a sensor 150, the electronic device may be added to the fast-list of the sensor 150 in order to increase the reliability of location based data with respect to the in-range electronic device. As another example, if a user of an area tracking system 100 desires to obtain location based data of a particular electronic device with a higher priority than other electronic devices, sensors 150 may be instructed to move an electronic device address to the fast list. For example, in order to locate a missing child in possession of an electronic device during an amber alert in a shopping mall, every sensor 150 may be instructed by an ATS 110 to add the electronic address of the child's electronic device to their fast lists. One having ordinary skill in the art will understand that many configurations are possible in light of the present disclosure. For example, an ATS 110 may instruct sensors 150 to disregard the slow and fast lists, and constantly poll for a single electronic device, or for several multiple electronic devices.

Referring to FIG. 5, a sensor 150 may poll for an electronic device by broadcasting an active electronic device address (e.g., a BT-MAC-ID) from a first list (e.g., slow-list) as shown in step S500. The sensor 150 may wait for a reply for up to a time period T1 (e.g., 5 seconds) or until a reply is received from the corresponding electronic device.

If a reply is received at step S510, the sensor 150 may send the active electronic device address to an ATS 110 and move the active electronic device address from the first list to a second list at step S560. For example, because an electronic device corresponding to the active electronic device address is determined to be inside the range of the sensor 150, the active electronic device address may be moved to the second list (e.g., fast-list). The sensor may send other data in addition to the electronic device address to the ATS 110. For example, the sensor may send an identification (ID) of the sensor 150 along with the active electronic device address to the ATS 110.

At step S530, the sensor 150 may determine if a time period T2 has elapsed. If the time period T2 has not elapsed the sensor 150 may select a new electronic device address from the first list as the active electronic device address at step S550. For example, the sensor 150 may switch the active electronic device address to a next electronic device address on the first list. At step S500, the sensor 150 may poll for the active electronic device address.

If the time period T2 is determined to have elapsed at step S530, the sensor 150 may select an electronic device address from the second list as the active electronic device address at step S540. For example, the sensor 150 may switch the active electronic device address to a next electronic device address on the second list and begin cycling through the second list (as described below with respect to FIG. 6).

If a reply is not received at step S510 within T1 seconds, the sensor 150 may determine if the time period T2 has elapsed. If the time period T2 has not elapsed the sensor 150 may select a different electronic device address from the first list as the active electronic device address at step S550. For example, the sensor 150 may switch the active electronic device address to a next electronic device address on the first list. At step S600, the sensor 150 may poll for the active electronic device address.

If the time period T2 is determined to have elapsed by the sensor 150 at step S530, the sensor 150 may select an electronic device address from the second list as the active electronic device address at step S540. For example, the sensor 150 may switch the active electronic device address to a next electronic device address on the second list and begin cycling through the second list (as described below with respect to FIG. 6).

Referring to FIG. 6, a sensor 150 may poll for an electronic device by broadcasting an active electronic device address (e.g., a BT-MAC-ID) from a second list (e.g., fast-list) as shown in step S600. The sensor 150 may wait for a reply to the poll for up to a time period T3 (e.g., 5 seconds) or until a reply is received from the corresponding electronic device. If a reply is received at step S610, the sensor 150 may determine if the time period T4 has elapsed at step S660. If the time period T4 has not elapsed the sensor 150 may select a different electronic device address from the second list as the active electronic device address at step S670. For example, the sensor 150 may switch the active electronic device address to a next electronic device address on the second list. At step S600, the sensor 150 may poll for the active electronic device address.

If the time period T4 is determined to have elapsed by the sensor 150 at step S660, the sensor 150 may select an electronic device address from the first list as the active electronic device address at step S650. For example, the sensor 150 may switch the active electronic device address to a next electronic device address on the first list and begin cycling through the first list (as described above with respect to FIG. 5).

If a reply is not received by the sensor 150 within the time period T3 at step S610, at step S630, the sensor 150 may send the active electronic device address to an ATS 110 and move the active electronic device address from the second list to the first list. For example, because an electronic device corresponding to the active electronic device address is determined to be outside the range of the sensor 150, the active electronic device address may be moved to the first list (e.g., slow-list). The sensor may send other data in addition to the electronic device address to the ATS 110. For example, the sensor may send an identification (ID) of the sensor 150 that detects the electronic device to the ATS 110.

At step S640, the sensor 150 may determine if the time period T4 has elapsed. If the time period T4 has not elapsed the sensor 150 may select a different electronic device address from the second list as the active electronic device address at step S670. For example, the sensor 150 may switch the active electronic device address to a next electronic device address on the second list. At step S600, the sensor 150 may poll for the active electronic device address.

If the time period T4 is determined to have elapsed by the sensor 150 at step S640, the sensor 150 may select an electronic device address from the first list as the active electronic device address at step S650. For example, the sensor 150 may switch the active electronic device address to a next electronic device address on the first list and begin cycling through the first list (as described above with respect to FIG. 5).

Example embodiments with respect to FIGS. 5 and 6 describe the use of two lists. However, any number of lists of electronic device addresses are contemplated by example embodiments. For example, additional lists may be used to provide cycling of lists at more than two frequencies. Further, different lists may be used at different times of day (e.g., day shift, night shift) or different days (staggered shifts). Example embodiments are described with respect to two lists in FIGS. 5 and 6 for ease of explanation and not to limit the inventive concepts disclosed herein. Similarly, the exact determinations and consequences of those determinations as described with respect to FIGS. 5 and 6 are not limiting of the scope of example embodiments but only illustrative of the inventive concepts.

Figure 7:
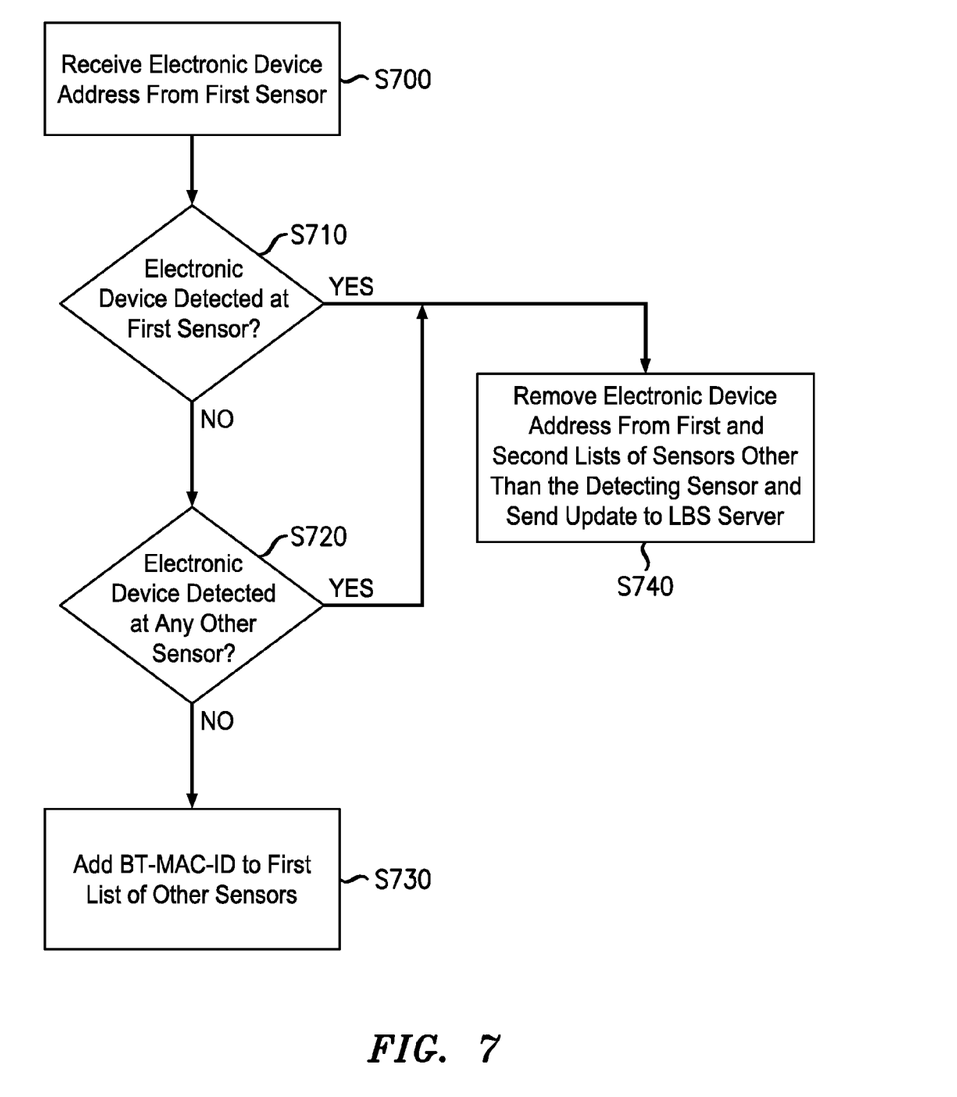
FIG. 7 is a flow diagram illustrating methods of administering the tracking of electronic devices at a server according to an example embodiment.

FIG. 7 is a flow diagram illustrating methods of administering the tracking of electronic devices at the ATS 110 of FIG. 1 according to an example embodiment. Referring to FIG. 7, an ATS 110 may receive a message from a sensor 150 at step S700. For example, the ATS 110 may receive an electronic device address (e.g., BT-MAC-ID) from the sensor 150. According to an example embodiment the ATS 110 may receive an electronic device address and the ID of the sensor 150 sending the electronic device address.

At step S710, the ATS 110 may determine whether or not the electronic device 160 corresponding to the received electronic device address is in range or out of range of the sending sensor 150 based on a current state of one or more lists maintained at the ATS 110 for the sending sensor 150. According to other example embodiments, the message received by the ATS 110 may indicate whether or not the electronic device 160 corresponding to the received electronic device address is in range or out of range of the sending sensor 150 and a determination may not be necessary.

If the electronic device 160 corresponding to the received electronic address is detected by the sending sensor 150, at step S740 the ATS 110 may remove the received electronic address from first and second lists of sensors 150 other than the sending sensor 150 and send an update to one or more LBS servers 120. The ATS 110 may remove the received electronic address from first and second lists of the sensors 150 maintained at the ATS 110 and/or send instructions to the sensors 150 to remove the received electronic address from first and second lists maintained at the sensors 150.

If the electronic device 160 is not detected by the sending sensor 150, at step S720 the ATS 110 may determine if any other sensor 150 of the area tracking system 100 detects the electronic device 160. For example, receipt of the electronic device address from a sensor 150 may indicate that the corresponding electronic device recently left a coverage area of the sending sensor 150. The ATS 110 may then determine whether the electronic device 160 has moved into range of any other sensor 150. If the ATS 110 determines that the electronic device 160 is detected by a different sensor 150 from the sending sensor 150 at step S720, at step S740, the ATS 110 may remove the received electronic address from first and second lists of sensors 150 other than the detecting sensor 150 and send an update to one or more LBS servers 120.

If the ATS 110 determines that the electronic device 160 is not detected by a different sensor 150 from the sending sensor 150 at step S720, the ATS 110 may add the received electronic address to first lists of sensors 150 other than the sending sensor 150. Although not shown, the ATS 110 may send an update to one or more LBS servers 120. According to an example embodiment, the received electronic device address may be added as a next device to be polled for on first lists of the sensors 150 other than the sending sensor 150 so that each sensor next attempts to detect the electronic device 160. The ATS 110 may add the received electronic address to first lists of the sensors 150 maintained at the ATS 110 and/or send instructions to the sensors 150 to add the received electronic address to first lists maintained at the sensors 150.

Although example embodiments described with respect to FIG. 7 provide for a specific set of responses including adding or removing electronic device addresses from specific lists, example embodiments are not so limited. Responses to information that an electronic device has come into range or gone out of range of a sensor may be tailored to the particular configuration of an area tracking system 100 and the goals of a user. For example, upon determining that an electronic device 160 has gone out of range of a detecting sensor 150, an ATS 110 may add an electronic device address corresponding to the electronic device to second lists (e.g., fast-lists) of sensors 150 with adjacent or overlapping scanner coverage to the detecting sensor 150 and add the electronic device address to first lists (e.g., slow-lists) of sensors 150 that are farther away. Various implementations within the scope of example embodiments will be understood by one of ordinary skill in the art in light of the present disclosure.

While example embodiments have been particularly shown and described, it will be understood by one of ordinary skill in the art that variations in form and detail may be made therein without departing from the spirit and scope of the claims.

We claim:

1. An area tracking system, comprising:
a server connected to a network; and
a plurality of sensors connected to the server, the sensors configured to poll for electronic devices by broadcasting poll messages, at least one of the electronic devices operating in a non-discoverable mode such that the at least one electronic device is not broadcasting a device access code, the poll message including the device access code of an associated electronic device, the poll message configured to instruct the electronic device to transmit an acknowledgement upon receipt of poll message, the acknowledgement including the device access code, wherein the sensors are configured to poll a first plurality of the electronic devices at a greater frequency than a second plurality of the electronic devices.

2. The area tracking system of claim 1, wherein
the sensors are configured to maintain first and second lists including device access codes of the electronic devices, and to poll for electronic devices corresponding to device access codes of the first list at a greater frequency than for electronic devices corresponding to device access codes of the second list, and
the sensors are configured to detect any of the electronic devices in range of the sensors that respond to the polling including electronic devices operating in the non-discoverable mode, and to communicate the detection, or a change in the detection, to the server.

3. The area tracking system of claim 1, further comprising:
a plurality of wireless access points connected to the network,
wherein at least one of the sensors is a wireless sensor connected to the server through at least one of the wireless access points, and
the wireless sensor is configured in an access-point-client mode to establish a client into the wireless access point.

4. The area tracking system of claim 1, wherein
at least one of the sensors is a wired sensor connected directly to the network, and
the wired sensor is configured as a wireless access point.

5. The area tracking system of claim 1, wherein
the sensors poll for the electronic devices using a short range transmitter to broadcast the poll message, and
the device access code is a Bluetooth Media Access Control (MAC) address.

6. The area tracking system of claim 5, wherein the short range transmitter broadcasts a signal detectable by an electronic device in a range from about 1 to about 100 meters.

7. The area tracking system of claim 6, wherein the sensors are spatially distributed such that a scanning area of at least one of the sensors does not overlap with a scanning area of any other sensor.

8. The area tracking system of claim 3, further comprising:
a Location-Based Services (LBS) server connected to the server though the network.

9. The area tracking system of claim 2, wherein
the server is configured in a high-availability and redundant mode, and
the sensors are configured to exchange command and control messages with the server.

10. The area tracking system of claim 2, wherein the server is configured to update the first and second lists by instructing the sensors to add or remove device access codes from the first and second lists based on the communication of detection, or the change of the detection, of any of the plurality of electronic devices.

11. A method of tracking a plurality of electronic devices using a plurality of sensors connected to a server, the method comprising:
polling, by a sensor, for a first electronic device by broadcasting a poll message associated with the first electronic device, the first electronic device operating in a non-discoverable mode such that the first electronic device is not broadcasting a device access code, the poll message including the device access code of the first electronic device, the poll message configured to instruct the first electronic device to transmit an acknowledgement upon receipt of poll message, the acknowledgement including the device access code;
determining whether the first electronic device is within range of the sensor based on whether or not the acknowledgement is received by the sensor within a period of time; and
transmitting, to a server, data relating to a position of the first electronic device wherein the first electronic device is one of a plurality of first electronic devices and the sensor is configured to poll the plurality of first electronic devices at a greater frequency than a plurality of second electronic devices.

12. The method of claim 11, further comprising:
polling, by the sensor, for a second electronic device of the plurality of second electronic devices upon one of receiving the acknowledgement from the first electronic device and expiration of the period of time.

13. The method of claim 11, further comprising:
publishing presence information to a Location-Based Services (LBS) server,
wherein the transmitting of the data relating to the position of the first electronic device includes transmitting the device access code of the first electronic device and sensor identification information to the server upon determining that the first electronic device is within range of the sensor, and
the presence information is published based on the data relating to the position of the first electronic device.

14. A method of tracking a plurality of electronic devices using a plurality of sensors connected to a server, the method comprising:
maintaining, by a first sensor, first and second lists including a plurality of electronic device addresses corresponding to a plurality of electronic devices, at least one of the electronic devices operating in a non-discoverable mode such that the electronic device is not broadcasting a device access code;
sequentially polling, by the first sensor, for the plurality of electronic devices by sequentially broadcasting poll messages that are each associated with one of the electronic devices, the poll messages including the device access code of an associated one of the plurality of electronic devices, each of the poll messages configured to instruct the associated electronic device to transmit an acknowledgement upon receipt of poll message, the acknowledgement including the device access code;
determining whether one of the plurality of electronic devices is in range of the first sensor based on whether or not the acknowledgement is received by the first sensor within a first period of time; and
transmitting, to a server, data relating to a position of the one of the electronic devices wherein the sequentially polling the plurality of electronic devices sequentially polls the electronic devices corresponding to a first one of the first and second lists at a greater frequency than the electronic devices corresponding to a second one of the first and second lists.

15. The method of claim 14, wherein the sequential polling by the first sensor includes sequentially polling for electronic devices corresponding to the first list until a second period of time elapses, and then sequentially polling for electronic devices corresponding to the second list until a third period of time elapses.

16. The method of claim 15, wherein, during the sequential polling of the electronic devices corresponding to the first list, upon determining that one of the electronic devices corresponding to the first list is in range, a device access code of the in range electronic device is moved to the second list, and
the transmitting of the data relating to the position of the one of the electronic devices includes transmitting sensor identification information of the first sensor and the device access code of the in range electronic device.

17. The method of claim 15, wherein, during the sequential polling of the electronic devices corresponding to the first list, upon determining that one of the electronic devices corresponding to the first list is out of range, a next one of the electronic devices corresponding to the first list is polled.

18. The method of claim 15, wherein, during the sequential polling of the electronic devices corresponding to the second list, upon determining that one of the electronic devices corresponding to the second list is in range, a next one of the electronic devices corresponding to the second list is polled.

19. The method of claim 15, wherein during the sequential polling for the electronic devices corresponding to the second list, upon determining that one of the electronic devices of the second list is out of range, a device access code of the out of range electronic device is one of moved to the first list and removed from the second list, and the transmitting of the data relating to the position of the one of the electronic devices includes transmitting sensor identification information of the first sensor and the device access code of the out of range electronic device.

20. The method of claim 16, further comprising:
receiving, at the server, the sensor identification information of the first sensor and the device access code of the in range electronic device; and
instructing, by the server, removal of the device access code of the in range electronic device from at least one of first and second lists maintained by a second sensor.

21. The method of claim 14, further comprising:
instructing, by the server, removal of a device access code from the first and second lists of the first sensor based on a priori information that an electronic device corresponding to the device access code cannot be in range of the first sensor.

22. The method of claim 14, further comprising:
publishing presence information to a Location-Based Services (LBS) server based on the data relating to the position of the one of the electronic devices.

23. The method of claim 15, further comprising:
generating the first and second lists by enrollment and registration,
wherein enrollment includes extracting at least one device access code from at least one of a form, an electronic mail (email) and a web interface entry, and
registration includes detecting the at least one device access code at a kiosk.

24. The method of claim 23, wherein the detection of the at least one device access code at the kiosk includes emulating, by the kiosk, the operation of a pairing electronic device, and
automatically detecting the at least one device access code during a pairing process between the at least one electronic device and the kiosk.

25. The method of claim 23, wherein the detection of the at least one device access code at the kiosk includes detecting the at least one device access code from an existing communication link between the at least one electronic device and a paired electronic device.

\* \* \* \* \*